United States Patent [19]
Schutten

[11] Patent Number: 6,133,716
[45] Date of Patent: Oct. 17, 2000

[54] HIGH-EFFICIENCY HIGH-POWER UNINTERRUPTED POWER SYSTEM

[75] Inventor: Herman P. Schutten, Milwaukee, Wis.

[73] Assignee: Statordyne, Inc.

[21] Appl. No.: 09/177,580

[22] Filed: Oct. 23, 1998

[51] Int. Cl.[7] .................................................. H02J 9/08
[52] U.S. Cl. .............................. 322/40; 322/4; 290/30 A; 307/64
[58] Field of Search .................... 290/1 R, 1 A, 290/30 A, 30 B, 40 R; 322/4, 40; 307/67, 64

[56] References Cited

U.S. PATENT DOCUMENTS

| | | | |
|---|---|---|---|
| 3,541,409 | 11/1970 | Storsand | 322/4 |
| 3,558,901 | 1/1971 | Jacobus | 290/30 |
| 3,675,112 | 7/1972 | Smith | 322/4 |
| 4,218,624 | 8/1980 | Schiavone | 290/45 |
| 4,412,170 | 10/1983 | Roesel, Jr. | 322/4 |
| 4,433,547 | 2/1984 | Firey | 60/711 |
| 4,439,720 | 3/1984 | Georges | 322/4 |
| 4,458,156 | 7/1984 | Maucher et al. | 290/38 R |
| 4,473,753 | 9/1984 | Izumi at al. | 290/45 |
| 4,580,402 | 4/1986 | Firey | 60/711 |
| 4,626,696 | 12/1986 | Maucher et al. | 290/38 R |
| 4,629,947 | 12/1986 | Hammerslag et al. | 318/161 |
| 4,857,755 | 8/1989 | Comstock | 307/47 |
| 5,646,458 | 7/1997 | Bowyer et al. | 307/67 |
| 5,821,630 | 10/1998 | Schutten | 290/30 R |
| 5,913,932 | 6/1999 | Takayama | 72/405.09 |

*Primary Examiner*—Nick Ponomarenko
*Attorney, Agent, or Firm*—Hovey, Williams, Timmons & Collins

[57] ABSTRACT

An uninterrupted power supply (UPS) system provides power to an electrical load when utility line power fails. When the utility line power is normal a synchronous dynamo serves as a motor, and a first variable-ratio transmission arrangement is combined with a differential gear box to drive a flywheel with very low losses. When the utility line power fails, further variable-ratio transmission components are activated to assist the first transmission in conducting power from the flywheel to the dynamo. The dynamo now acts as a generator to supply power to the load. The invention is characterized by high standby efficiency and by a capability to run the flywheel down to a very low speed before it is unable to continue driving the dynamo.

19 Claims, 9 Drawing Sheets

HIGH-EFFICIENCY HIGH-POWER UNINTERRUPTED POWER SYSTEM

FIELD OF THE INVENTION

The invention relates to uninterrupted power supply (UPS) systems that provide power to electrical loads when power fails from normal sources such as electric utility power lines.

BACKGROUND OF THE INVENTION

Some electrical equipment such as computers can be severely disrupted if their supply of electrical power is interrupted for even a few seconds. Uninterrupted power supply (UPS) systems are in common use to prevent the disruption of operations when a normally used electric power line falters or fails. In some UPS systems, a standby internal-combustion engine is automatically started upon failure of the utility power line. The standby internal-combustion engine drives an AC electric dynamo, which supplies electrical power to the load until normal power is restored.

When the utility power fails the internal-combustion engine requires a few seconds to start and to accelerate to a speed fast enough to drive the dynamo to produce the desired electrical output frequency. Thus there is a delay, which could result in a harmful interruption of power to the load if the delay were not bridged.

To bridge the delay upon utility power failure, an already spinning flywheel has been used in typical prior art systems to drive the electrical dynamo until the utility power is restored or, in case of a prolonged utility power failure, until the internal-combustion engine has been brought up to speed. The dynamo is usually a synchronous machine that can operate as a generator and a motor. While the utility power is normal, the dynamo acts as a motor; it idles on the power line and keeps the flywheel spinning at a high speed. Upon a utility power failure the emergency dynamo acts as a generator; it is driven by the flywheel, which has stored kinetic energy.

During a utility power outage and before the internal combustion engine takes over the load, and while the flywheel drives the dynamo, the speed of the flywheel gradually diminishes. The flywheel alone cannot drive the dynamo at a constant speed. A variable hydraulic transmission, connected mechanically between the flywheel and the dynamo, has been used in the prior art to keep constant the speed at which the flywheel drives the dynamo. The hydraulic transmission converts the varying speed of the flywheel to a constant speed at the dynamo's shaft.

After the engine has come up to full speed it is connected by a main clutch to the dynamo, so the flywheel is relieved of providing the main power. The speed of the engine is maintained constant thereafter by a governor or electronic control loop.

A first important problem in prior UPS art is low efficiency when the system is on standby, i.e., when the dynamo and flywheel are spinning in readiness to supply power if and when the utility power line fails. The system is in standby mode most of the time, so it is very desirable to minimize parasitic standby losses. These losses include flywheel and dynamo "windage" losses, friction losses, and various hydraulic losses.

Some of the power losses occur in the hydraulic variable-ratio transmission that connects the flywheel to the dynamo. The hydraulic "windage" loss in a pump is generally proportional the square of the pump's speed. A typical value for a six-cubic-inch-per-revolution pump attached to a flywheel would be about 11 kilowatts (kW) at 3,600 rpm. If the standby pump speed was 5,400 rpm, the hydraulic windage loss would be about 25 kW. Conversely, if the pump attached to the flywheel were to have a standby speed of only 1,800 rpm, the loss would be less than 3 kW. To minimize hydraulic losses, the hydraulic devices should be operated at the lowest practical speed and the highest practical pressure, and a gear box is desirable.

A second important problem in prior UPS art is that the flywheel cannot deliver enough power when it reaches a low speed, even though it may still have a useful amount of kinetic energy left. Therefore, the "ride-through time" provided by the flywheel is not long enough. The "ride-through time" is the interval in which the flywheel supplies power to the dynamo, starting when the main power source fails and ending when the utility power is restored or the emergency engine takes over the load. It is desirable to extend the ride-through time by extending a UPS system's ability to deliver power at lower flywheel speeds.

A typical 500 kW UPS system might require as many as five hydraulic motors and five pumps. Because the standby losses of so many hydraulic elements would be very great, they should be decoupled from the rotating elements during standby, either mechanically or hydraulically. When the hydraulic elements are mechanically decoupled, it is desirable also to provide a braking action on shaft of a pump or motor to prevent its rotation due to fluid manifold pressure. Otherwise, since fluid pressure creates a torque proportional to a hydraulic device's displacement, a free-shaft device having little inertia could be accelerated to high speeds, creating high losses.

SUMMARY OF THE INVENTION (1) The first of several objectives of the invented UPS is to achieve low losses while the main electrical power source is providing power normally, during which time the UPS is in a standby mode with its flywheel spinning. Accordingly, the invention provides a unitary emergency power system in which an adaptive hydraulic transmission is combined with a differential gear box in a particular way to drive a flywheel in standby mode so as to have a minimum of power losses.

A preferred embodiment of the invention is a UPS having a planetary differential gear box ("differential") along with the hydraulic transmission, and configured such that the hydraulic motors are effectively not rotating during standby, without using a clutch on those motors. Moreover, all but one pump are removed from the system (via clutch-brakes) during standby. The remaining pump is connected to the flywheel by a gear box such that its standby speed is low (e.g. 1800 RPM). In this configuration, the system consumes very little power when on standby.

(2) The second of several objectives of the invented UPS is to achieve a long time during which the flywheel provides power to the dynamo. To accomplish this, an auxiliary pump (or a group of pumps) comes into play during a power outage to assist the first pump to carry the load, thus providing the adaptive transmission with the capability to extract energy from the flywheel until the flywheel reaches a very low speed and long ride-through time.

A plurality of pumps has a high fluid-flow rate. The high fluid-flow rate that characterizes a plurality of pumps enables the flywheel speed to decline to a very low value before it becomes unable to continue to drive the dynamo effectively.

(3) If desired the controller can be arranged to assist transiently the primary power source even when the primary source is not functioning very well. For example, the invented UPS system can act to minimize undesirable regulation effects of brief load changes, sagging of the utility line voltage and "brownouts".

DESCRIPTION OF THE PREFERRED EMBODIMENT

Figure 1:
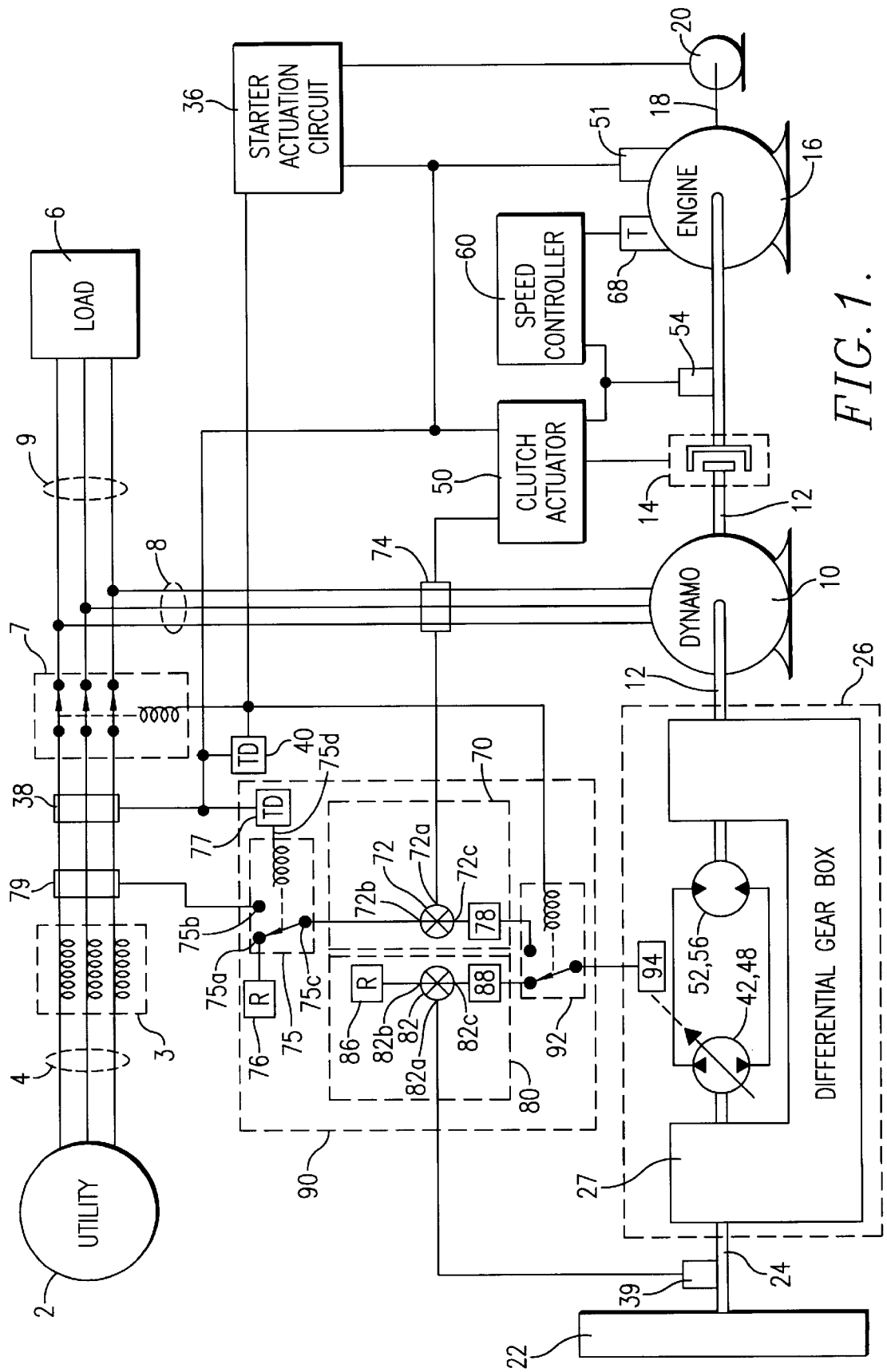
FIG. 1 is a simplified block diagram of a preferred embodiment of the invention.

The following text first describes the components of the preferred embodiment and their interconnections, then the operations of the embodiment under various conditions.

U.S. patent application Ser. No. 08/555,873, filed Nov. 13, 1995, entitled "Flywheel-Speed Sensing for Control of an Emergency-Power Engine," of inventor Herman P. Schutten, is incorporated in and made part of this disclosure.
Power Lines and Dynamo Referring to FIG. 1, a utility AC power source 2 is connected to supply power under normal conditions through a set of power lines 4, a set of self-inductors 3, a circuit breaker 7, and power lines 9, to an electrical load 6.

A set of emergency power lines 8 is connected to the normal-load power lines 9, and to the output terminals of a conventional polyphase dynamo 10. The dynamo 10, which supplies power to the load 6 during a line-power outage, has a main shaft 12 extending in both directions from its rotor.
Engine, Starter and Main Clutch One end of the dynamo shaft 12 is connected to one plate of a main clutch 14, whose other plate is connected to a first end of a shaft 18 of a conventional internal combustion engine 16. The opposite end of the engine shaft 18 is connected to a starter motor 20.

A starter actuation circuit 36 receives an input signal through a time delay device 40 from a line-power-condition sensor 38, which detects the condition of the utility power line 4 and produces a signal that discloses when the utility power falters or fails.

Main-Clutch Actuator

A main-clutch actuator 50 receives information signals from a tachometer on the engine shaft 18, and from a frequency meter 74 on the dynamo power lines 8. The circuit actuates the main clutch 14. Once engaged, the main clutch remains in an engaged position until it is commanded to open.
Engine Speed Control Circuit To regulate the speed of the engine 16, a closed-loop controller is provided, whose output controls a throttle of the engine 16. The tachometer on the shaft 18 senses the speed of the engine 16 and provides a signal to the controller, which has predetermined internal speed reference.
Transmission A conventional flywheel 22 has a shaft 24 that is connected to a variable transmission 26, which is shown in FIG. 1 as a dashed-line box. The other end of the transmission 26 is connected to the shaft 12 of the dynamo 10.

Figure 2:
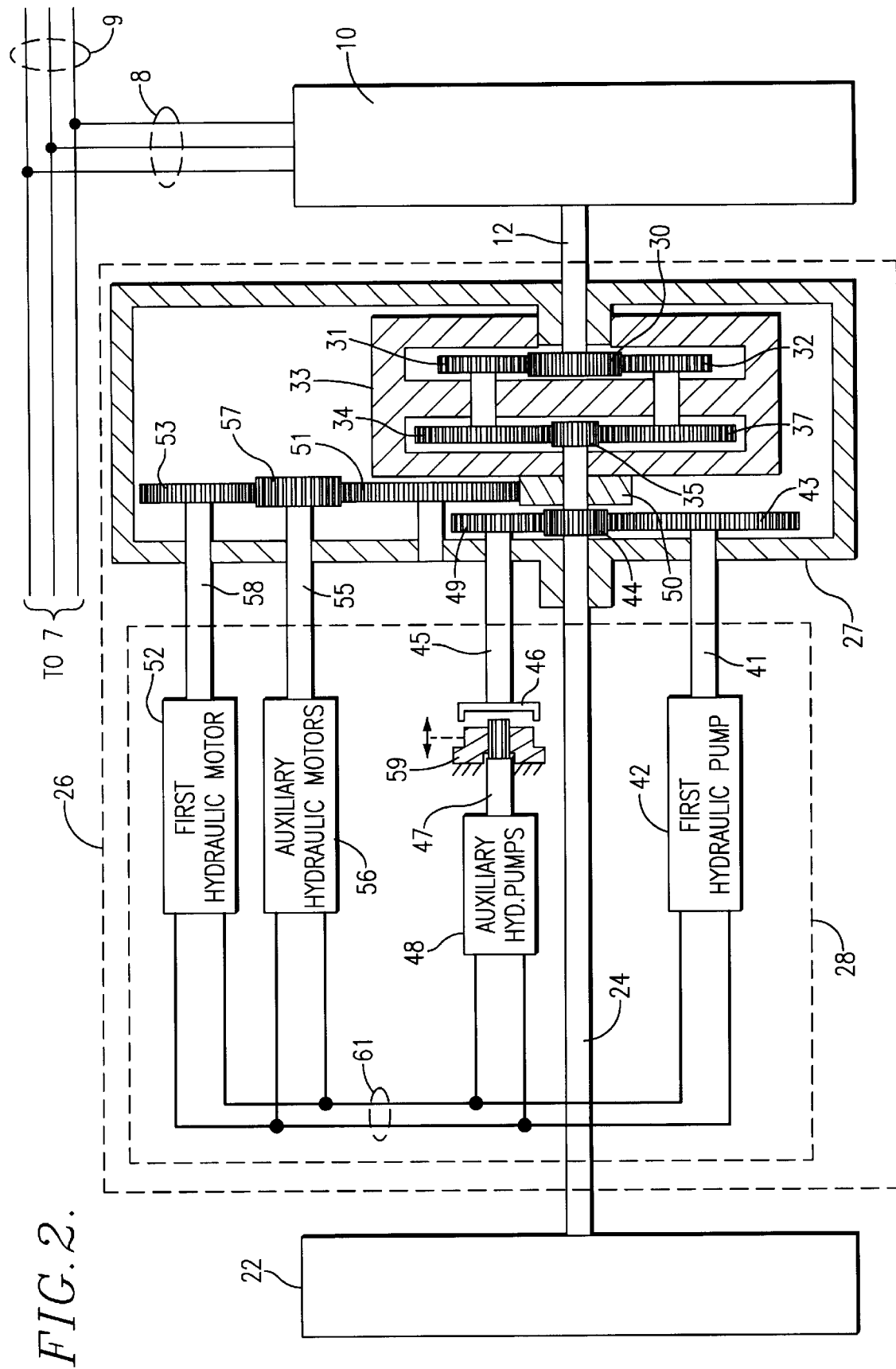
FIG. 2 is a more detailed diagram of the transmission block of FIG. 1, further illustrating the preferred embodiment of the invention.

As shown in FIG. 2, the major components of the transmission 26 are a differential gear box 27, a first hydraulic pump 42, and auxiliary hydraulic pumps 48, with all pumps connected via a common manifold 61 to first motor 52 and auxiliary motors 56. Within the housing of the differential gear box 27 is, among other things, a three-gear subassembly that is not part of the planetary differential gear portion of the gear box. That subassembly comprises a gear 44 (which is fastened to the flywheel shaft 24); a gear 43 (fastened to a shaft 41); and a gear 49 (fastened to a shaft 45). Both gears 43 and 49 engage the gear 44, so they firmly connect the flywheel with the hydraulic pumps.

The planetary differential assembly, within the housing 27, has a differential gear element that, in the preferred embodiment, comprises a planetary carrier 33 that supports a shaft that carries gears 31 and 34. Both gears 31 and 34 are fastened to that shaft, so they rotate together. Similarly, the carrier 33 supports another shaft that carries gears 32 and 37. Gears 32 and 37 are both fastened to that other shaft, so they rotate together. There may be additional shafts and gears similar to 32, 33 and 37, as necessitated by the planetary gearbox design.

Both of the gears 31 and 32 engage a gear 30, which is rigidly affixed to the dynamo shaft 12. Similarly, both of the gears 34 and 37 engage a gear 35, which is rigidly affixed to the flywheel shaft 24. The carrier 33 itself is rigidly fastened to a gear 50 that engage an idler gear 51, which connects it to gears 53 and 57, gear 53 being fastened to a shaft 58 to connect it externally with the first hydraulic motor 52, and gear 57 being fastened to shaft 55 to connect it externally with the auxiliary hydraulic motors 56.

Externally to the differential gear box 27, six shafts extend out. Shaft 24 is connected externally with the flywheel 22. Shaft 12 is connected externally with the dynamo 10. Shaft 41 is connected externally with the first variable hydraulic pump 42. Shaft 45 is connected externally to a clutch 46, which is actuated by a signal from the line power condition sensor. The clutch 46 enables engagement with a shaft 47 that is connected with the variable auxiliary pumps 48. When the shaft 47 is not connected through the clutch 46 to the shaft 45, it is instead in contact with a brake 59 that prevents rotation of the shaft 47. Shaft 58 is connected externally with the first hydraulic motor 52. Shaft 55 is connected externally with the auxiliary hydraulic motors 56.

The first hydraulic pump 42, the auxiliary hydraulic pumps 48 and the hydraulic motors 52, 56 are fluidly connected through a common manifold 61 so as to form the adaptive hydraulic transmission 28.

Mechanically, the hydraulic pumps 42 and 48 are effectively connected in parallel during a power outage; they in effect connect the flywheel 22 through the hydraulic motors 52, 56 to the planetary carrier 33, which is the differential gear element of the transmission 27.

Transmission Controller

As shown in FIG. 1, a transmission controller 90 is provided, that includes two closed-loop controllers, a "Utility-power-normal" controller 80, and a "Utility-power-failed" controller 70. The utility-power-failed controller 70 includes a comparator 72, which has input terminals 72a and 72b and an output terminal 72c. At input 72a, a signal is connected from a frequency sensor 74, which measures the frequency of electrical power on the power lines 8. Either of two frequency reference signals is connectable to the input terminal 72b, as will be described later. The output terminal 72c is connected to a module 78, which contains gain and compensation elements for the frequency-control loop of which controller 70 is a part.

The frequency reference signal at terminal 72b is received from an output terminal 75c of a selector device 75, which is shown as a relay. This reference-selection circuit is used to bring the dynamo 10 to the frequency and phase of the utility power lines 4 during restoration of utility power.

A reference module 76 for the frequency controller 70 is connected to one selectable terminal 75a of the relay 75. A line-frequency sensor 79 senses the frequency of the utility power lines 4 and provides a signal indicative of that frequency to the other selectable terminal 75b of the selector relay 75.

The actuator (relay coil in FIG. 1), of the selector device 75 is connected at a terminal 75d. It is energized by the output of a time-delay device 77, which receives its input signal from the line-condition sensor 38.

The utility-power-normal controller 80 includes a comparator 82, which has input terminals 82a and 82b and an output terminal 82c. At input 82a, a signal is connected from a flywheel tachometer. A reference module 86 representing a predetermined flywheel "cruising speed" is connected to input terminal 82b. Output terminal 82c is connected to a module 88, which contains gain and compensation elements for the flywheel-speed loop of which controller 80 is a part.

A loop-selector function switch 92 receives output signals from blocks 78 and 88, that is, from controllers 70 and 80. Function switch 92 is actuated, via a time-delay device, by the line-condition sensor. The loop-selector function switch 92 selects the output of the normal-utility controller 80 when the utility power is normal, and selects the output of the failed-utility controller 70 when the utility power has failed. The output of the function switch 92 is connected to a controller 94, which controls the position of the swash plates of the hydraulic pumps 42, 48 in the transmission 26.

The swash plates control the displacement, or amount of fluid transferred upon each rotation of the devices 42, 48, and consequently control the transmission ratio between each hydraulic transmission's input shaft and output shaft.

Operation of the Preferred Embodiment

The operation of the preferred embodiment, including time sequences of operation under several conditions, is described immediately below.

A. Operation with Normal Utility Power Conditions

Initially the voltage of the utility power line 4 is normal, the engine 16 is not running, the main clutch 14 is disengaged, the circuit breaker 7 is engaged to conduct power, and the loop selector mechanism function switch 92 is in the flywheel-speed-control position that utilizes controller 80. The dynamo 10 is operating as a motor, driven by the utility power line to supply friction losses to the flywheel 22 and other losses. The flywheel is spinning at a predetermined high cruising speed under control of the closed loop 80, and the transmission 26 is transmitting enough power from the dynamo 10 to the flywheel to keep it close to that cruising speed. During line transients when in the standby mode, the flywheel 22 may exchange power with the utility line 4 and load 6, in either direction.

Because conditions are normal at the utility AC power source 2 and the electrical power lines 4, the dynamo 10 is importing a relatively small amount of power from the lines 4, and the sensor senses and provides a signal that the utility line conditions are normal.

When the UPS of this embodiment is on standby, the dynamo may be spinning at 1800 rpm and the flywheel at 5400 rpm. The electronic controller 80 is responsive to a flywheel-speed signal to control the angle of the swash plate of the hydraulic pump 42. During standby, the hydraulic pump 42 usually has its swash plate set by the controller 80 for almost zero angular displacement, and it does not pump much fluid. Since almost no fluid flows in the lines that interconnect the hydraulic pump to the hydraulic motors 52, 56, the hydraulic motors have low speed and accordingly, low parasitic losses.

During standby the clutch 46 disengages only the auxiliary pumps 48, while brake 59 holds the pumps stationary. The fluid output of the first pump, 42, is sent through the common manifold 61 to the fluid motors 52, 56 when the controller 80 calls for power.

When on-line, the dynamo-flywheel-transmission-controller system provides voltage regulation (in case of utility voltage sag, brownouts, etc.), while also maintaining the flywheel's speed near its normal cruising speed.

B. Operation Immediately After Failure of Normal Utility Power and Before Start of the Emergency Engine When the utility power source 2 falters or fails, the line power condition sensor senses the change, and issues an alarm signal that starts the time-delay device, which, after a small delay, activates circuit breaker 7 to disengage the load and dynamo from the failed utility line, and switches the hydraulic transmission function switch 92 from flywheel-speed control to dynamo-frequency control, which uses controller 70.

The clutch 46 engages in response to a signal originating in the line power condition sensor. The signal line is omitted from the drawings for drawing clarity. The clutch 46 effectively connects the flywheel 22 through the gear 44 to the pumps 48. If desired, the clutch 46 can be a hydraulic clutch or can be individual clutches for each auxiliary pump, as can brake 59. The pumps 48 assist the pump 42 in supplying fluid to the hydraulic motors 52, 56.

During a power outage, the fluid outputs of pumps 42 and 48 are sent through the common manifold 61 to the fluid motors 52, 56.

For outages of the utility power that last only a few seconds there is enough energy in the flywheel 22 to supply power to the load without starting the engine 16.

The flywheel provides power during such brief outages, and the engine 16 may not yet be up to speed, or even started, by the time the normal power is restored.

The flywheel 22 supplies power through the transmission 26 to the dynamo 10 to power the electrical load 6. The relay 75 is in position 75a, which connects the reference device 76. When the line frequency sensor 74 senses a dynamo frequency that is less that the reference frequency 76, the controller 70 sends an error signal through the function switch 92 to the swash plate actuators, which move the swash plates to decrease the transmissions'0 speed ratios.

Power that is withdrawn from the flywheel through the transmission 26 accelerates the dynamo 10, to correct the low-frequency problem.

Conversely, if the flywheel is instantaneously supplying too much power, the frequency of the dynamo's output increases and the swash plates are moved so as to transmit power at a lower rate.

Thus, although the flywheel progressively slows down because of providing its energy through the transmission to the dynamo 10, the dynamo's electrical output is kept up to a rated frequency, because the positions of the swash plates are continuously automatically adjusted. The control system provides both voltage and frequency control.

C. Operation After Engine Has Started and Up to the Time of Engagement of the Main Clutch When the line power fails the engine 16 is automatically started and brought up to rated speed. Before it reaches rated speed the flywheel 22 supplies power to the dynamo 10. The main-clutch control circuit senses the speeds, and when the engine has reached a high enough speed to connect the engine to the dynamo 10 properly, the main clutch 14 is engaged, so power can be provided by the dynamo 10 to the electrical load 6.

D. Operation After Main Clutch is Engaged and Before Restoration of Utility Line Power Upon engagement of the main clutch 14, the engine 16 starts driving the dynamo 12, which supplies power to the electrical load 6.

Because both the engine 16 and the hydraulic transmission 26 are coupled to the shaft 12 of the dynamo 10, their torques are algebraically summed on that shaft. While the engine 16 is up to rated speed with the main clutch 14 engaged, the engine and the hydraulic transmission 26 are effectively in parallel for purposes of exchanging torque with the dynamo 10 and with each other.

Whenever the dynamo 10 receives excessive torque from either the engine 16 or the flywheel 22, as might occur when the electrical load 6 diminishes, the dynamo 10 starts to generate a frequency that is too high. The frequency sensor 74 and controller 70 recognize the frequency error, and the transmission 26 of the hydraulic loop promptly changes its ratio in a direction to reduce the torque supplied by the flywheel 22, or to send more power from the dynamo shaft 12 to the flywheel, so that excess torque at the dynamo's shaft is used to accelerate the flywheel.

When the flywheel is running below its nominal rated cruising speed, energy flows into the flywheel, so that it is "recharged" with energy to a desired nominal cruising speed, which is a predetermined set-point.

During a power-line outage whose duration is long enough for the engine 16 to start driving the load 6, the speed of the dynamo 10 after it starts driving the load, is controlled very closely because there is a torque summation on its shaft. Any torque in excess of the load's demand is available to bring the flywheel back up to its cruising speed.

E. Operation During and After Restoration of Normal Utility Power

When normal utility power is restored to the lines 4, the line power condition sensor senses the restoration, and the dynamo 10 comes to a frequency and phase equal to that of the revived utility power lines 4. The sensor circuit 38, commands the circuit breaker 7 to close when phase lock has occurred, reconnecting utility power 2 to the load 6.

The restoration-indicating signal from the sensor causes the main-clutch actuator to disengage the main clutch 14. It also turns off the engine's ignition circuit, and switches the selector function switch 92 to cause the controller 90 to revert to using the controller 80.

With the utility line power 2 back on, the dynamo 10 draws power from the power lines 4, 8, and again operates as a lightly-loaded motor. The dynamo provides torque to the flywheel 22 through the hydraulic transmission 26 to bring the flywheel up to its cruising speed. The dynamo can act as either a motor or a generator in the standby mode to assist the power line 4 in supplying unusual transient loads and in suppressing undesirable line transients.

The foregoing description refers to a first hydraulic motor and auxiliary hydraulic motors, and refers to a first hydraulic pump and auxiliary hydraulic pumps. The claims refer to a first transmission and an auxiliary transmission. The first transmission and the auxiliary transmission need not each be a complete and independent transmission; they can share components. For example, in the preferred embodiment described above, the auxiliary hydraulic pumps 48 are employed only in the auxiliary transmission, but the other pumps and motors 42, 52 and 56 are shared by the first transmission and the auxiliary transmission.

OTHER EMBODIMENTS

Figure 3:
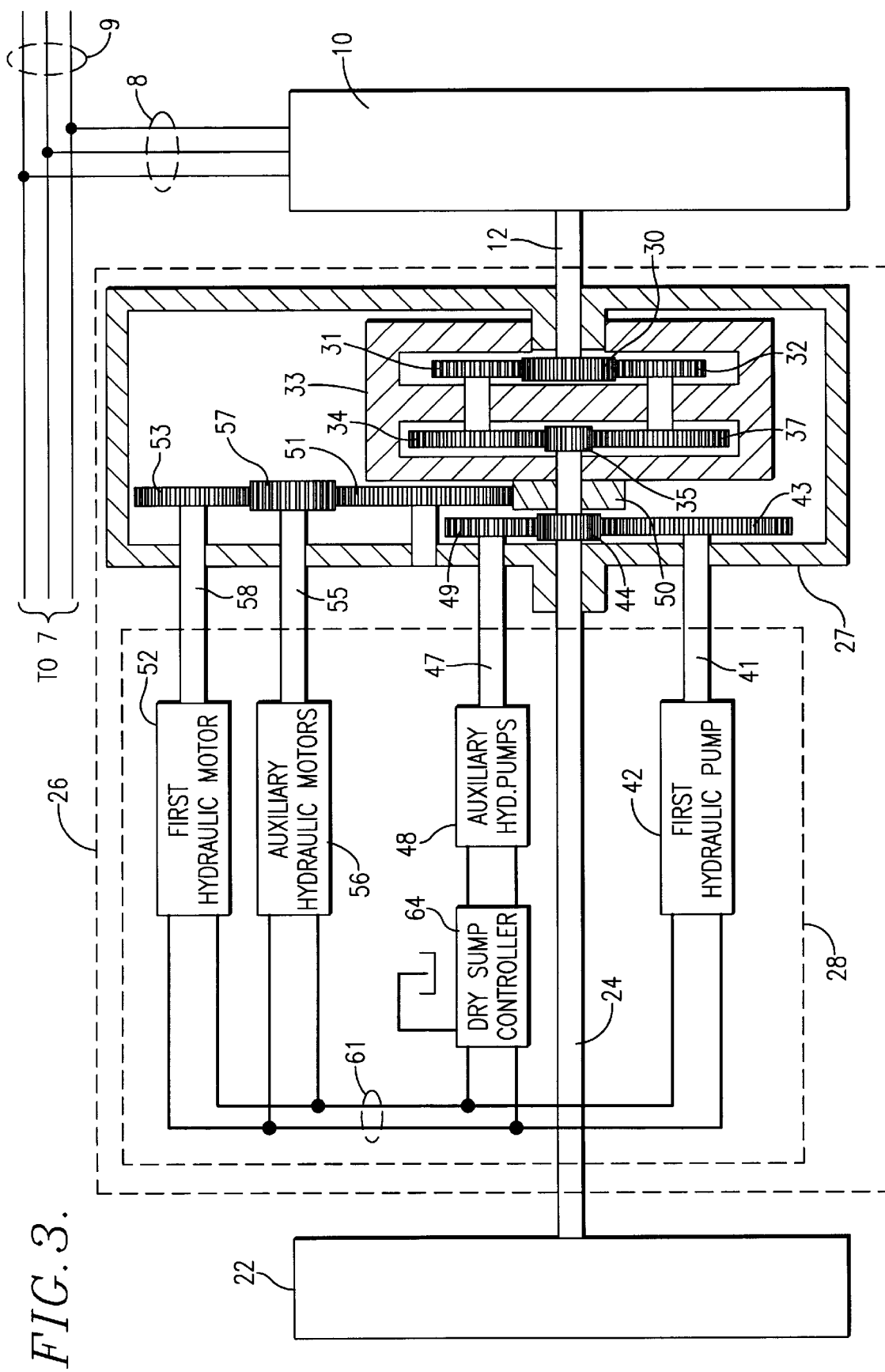
FIG. 3 shows a second embodiment, in which the clutch 46 of FIG. 2 is replaced by a dry-sump controller 64.

Although the invention has been described by means of a preferred embodiment, numerous other embodiments are possible, a few of which follow:

As an alternative to small clutches and brakes to decouple the hydraulic pumps 48 of the system, hydraulic elements could be operated "dry sump"; that is, the hydraulic fluid could be drained from the units that are to be decoupled, rendering them temporarily inoperative. A dry-sump apparatus 64 is indicated in FIGS. 3, 5, 7 and 9. FIG. 3 shows a second embodiment of the invention, in which the clutch 46 of FIG. 2 is replaced by a dry-sump controller 64 of a type known in the prior art. In the systems described herein it is preferably controlled by a signal from the line condition sensor 38, and acts upon the fluid reservoir 61 in a prior-art manner.

This is simpler to do if the system is not operated as a common manifold system. If a dry-sump system has a common manifold, it may be necessary to provide appropriate valving to allow the coupled transmission(s) to operate while the decoupled transmission(s) are drained of fluid. The dry-sump apparatus operates on at least the fluid lines of the auxiliary pumps 48. Separate fluid lines or valves may then be required for the first pump 42.

Figure 4:
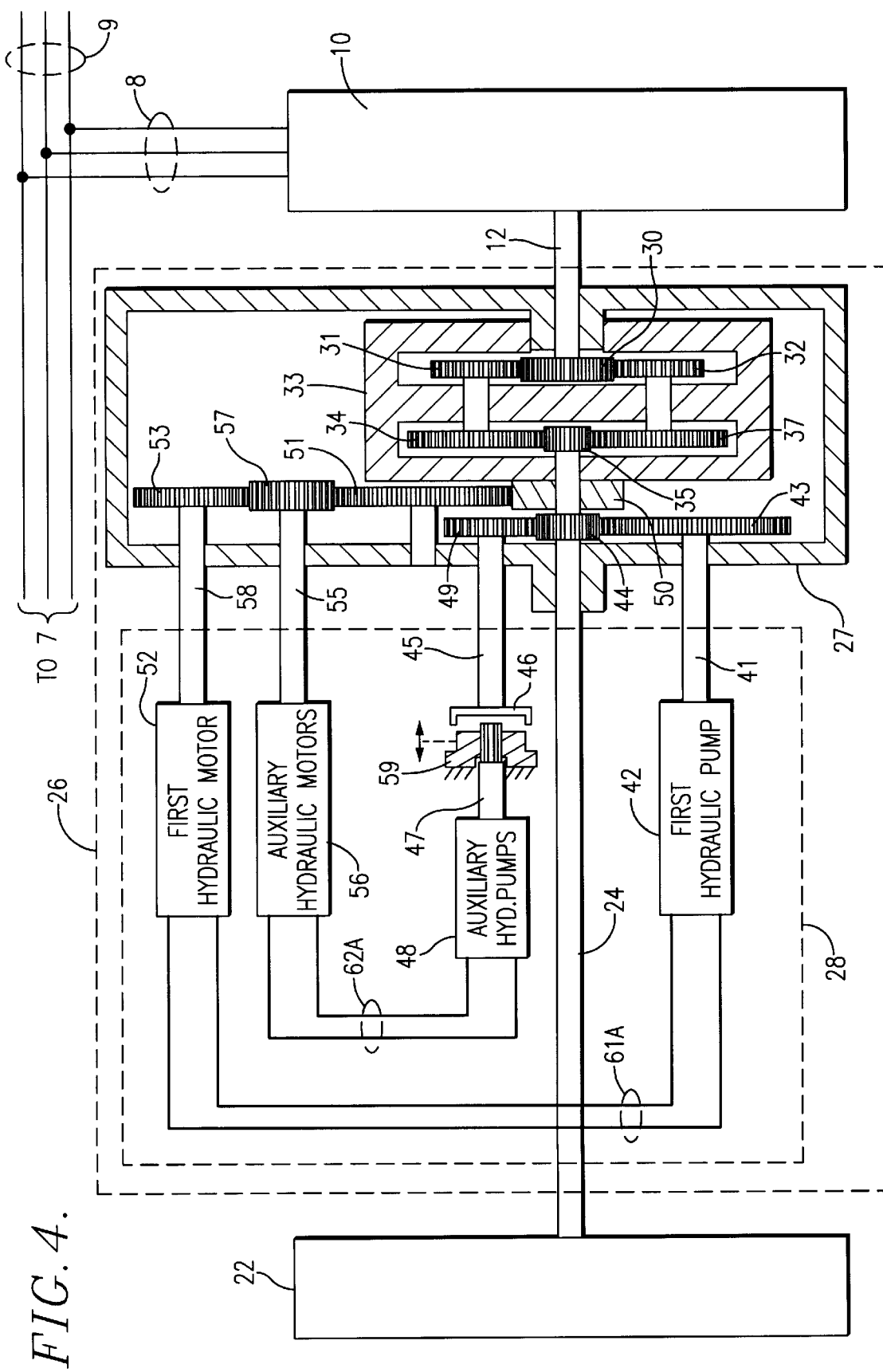
FIG. 4 is a third embodiment, having separate fluid connection lines for the first and auxiliary fluid transmissions.

Note that in FIG. 2 the system is depicted as having a common hydraulic manifold. An alternative configuration would be a system having separate hydraulic manifolds, (which would make the controls slightly more complex, but keep the hydraulic fluids separate to avoid total fluid contamination in the event of a device failure). FIG. 4 is a third embodiment of the invention, having separate fluid connection lines 61A and 62A for the first and auxiliary transmissions instead of common manifolds 61 as in FIG. 2.

Figure 5:
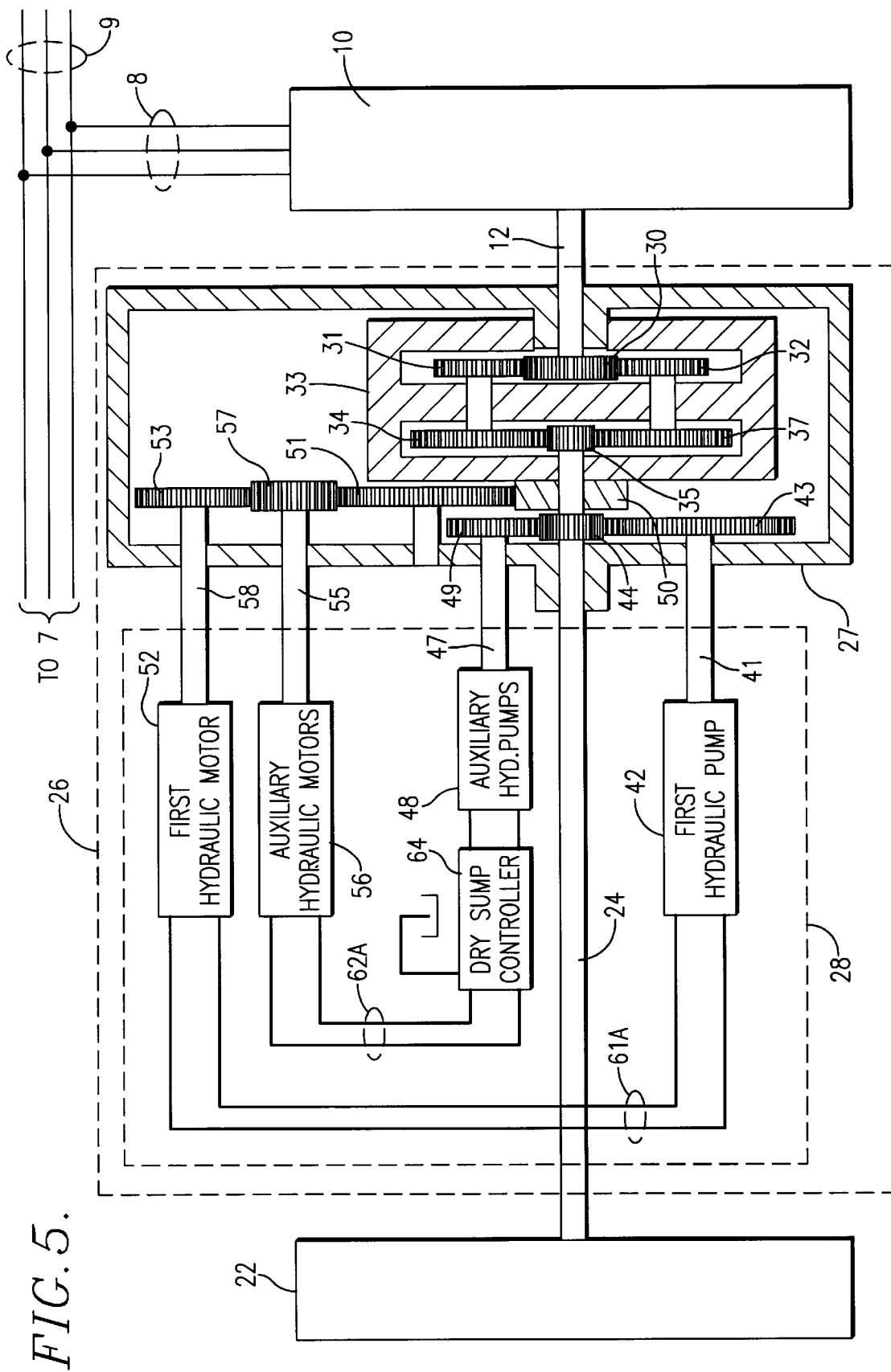
FIG. 5 depicts a fourth embodiment, having a dry-sump controller and separate fluid connection lines.
Figure 6:
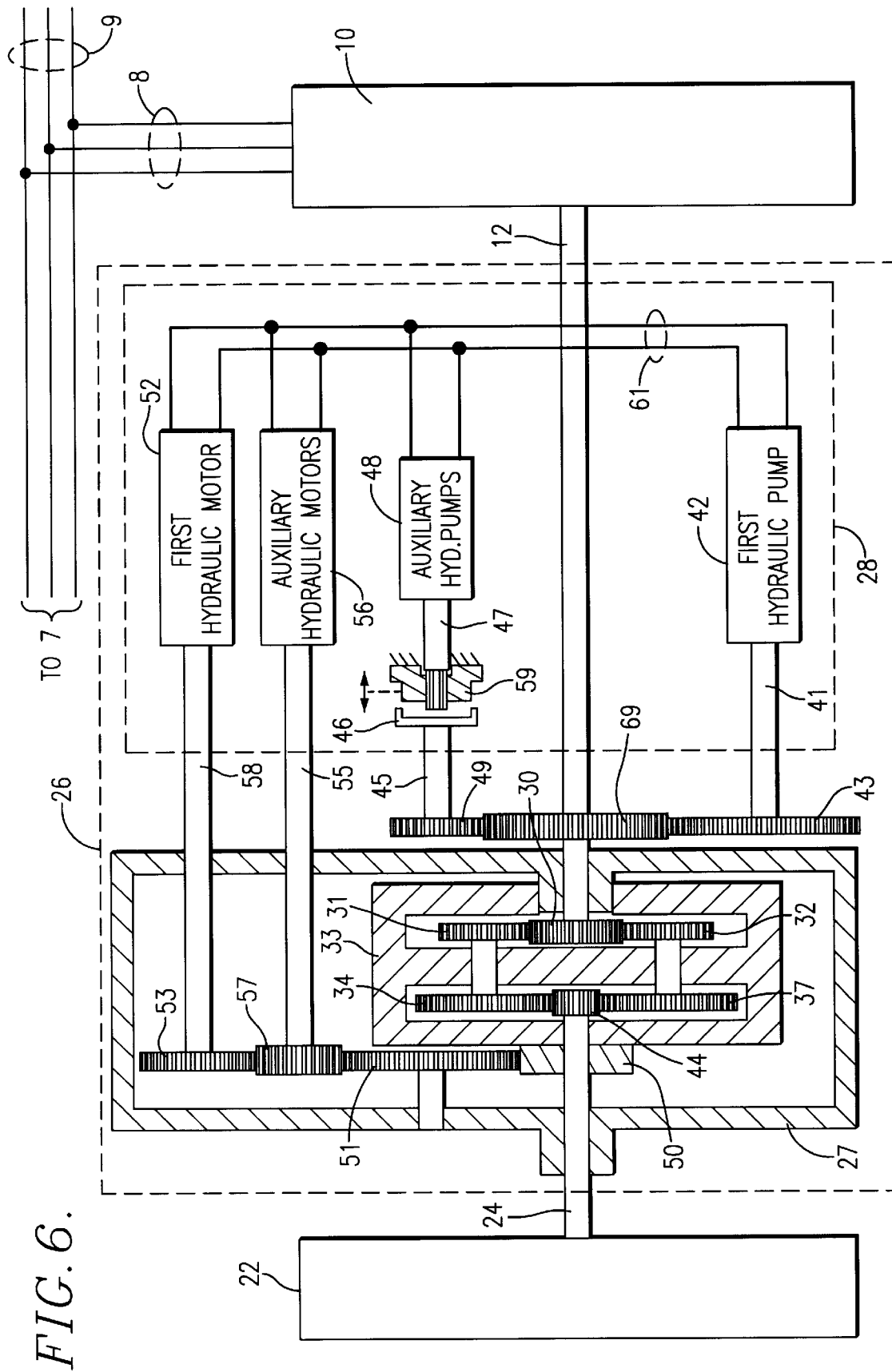
FIG. 6 is a fifth embodiment, in which hydraulic pumps are driven by the dynamo shaft instead of the flywheel shaft, and a clutch is used to disengage the auxiliary hydraulic pumps.
Figure 7:
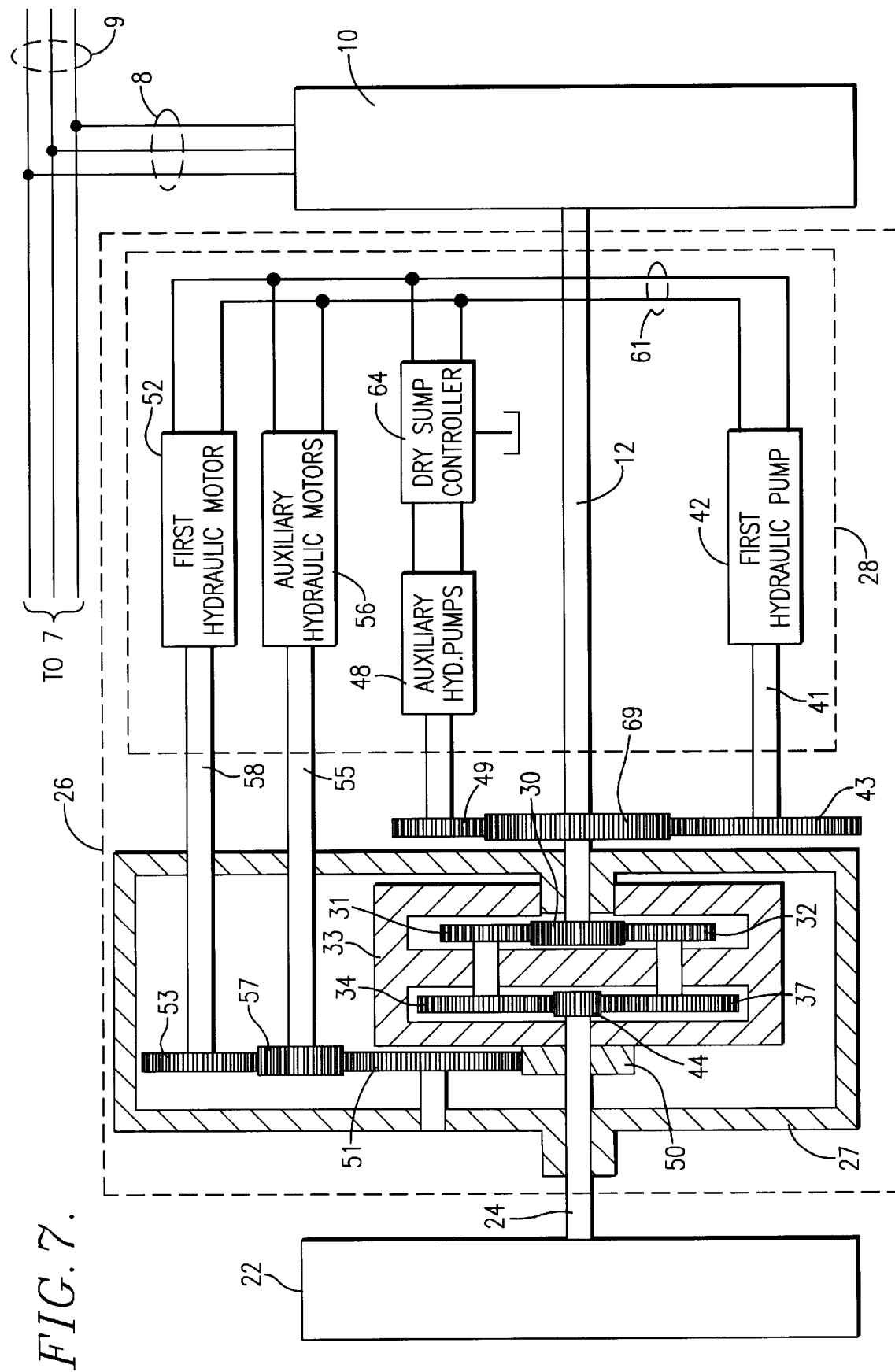
FIG. 7 shows a sixth embodiment, wherein pumps are driven by the dynamo shaft and a dry-sump controller disengages the auxiliary pumps.
Figure 8:
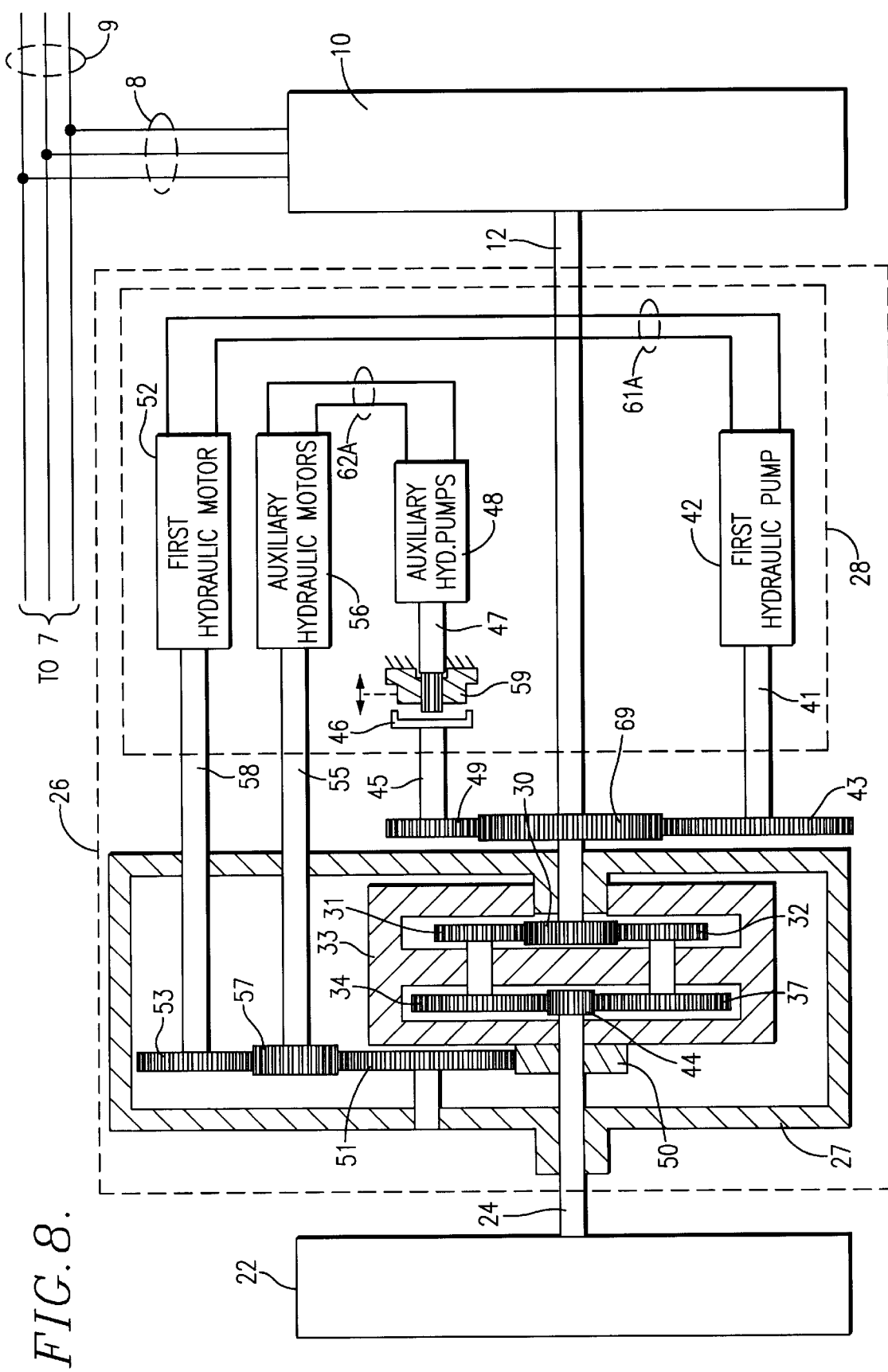
FIG. 8 shows a seventh embodiment, with pumps driven by the dynamo shaft, and there are separate fluid connection lines.
Figure 9:
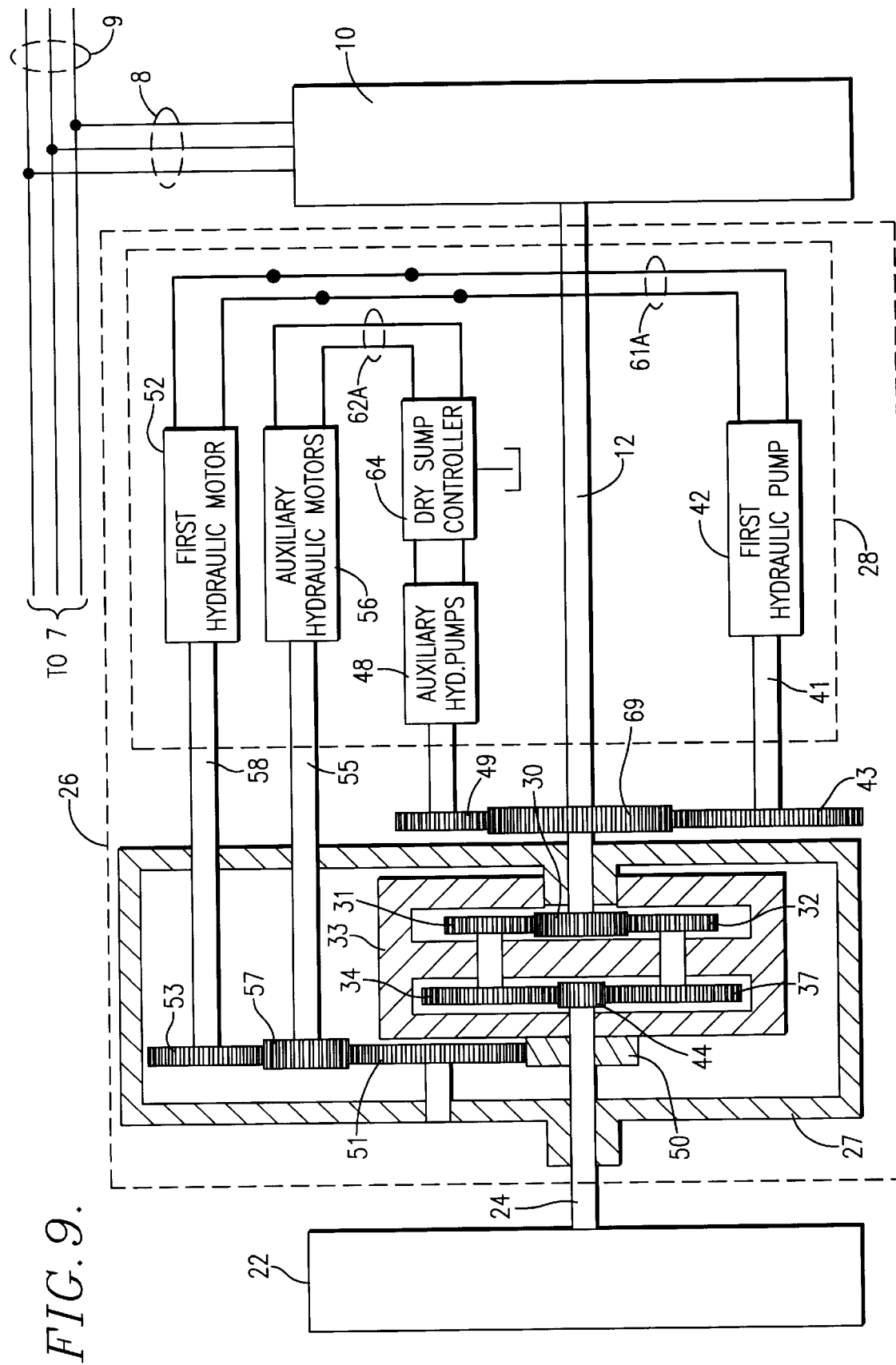
FIG. 9 is an eighth embodiment, having pumps driven by the dynamo shaft, a drysump controller and separate fluid connection lines.

FIG. 5 is a fourth embodiment, having a dry-sump controller and separate fluid connection lines. FIG. 6 depicts a fifth embodiment, in which hydraulic pumps and motors are driven by the dynamo shaft instead of the flywheel shaft, and a clutch is used to disengage the auxiliary hydraulic pumps. In FIG. 6 a gear 69 is affixed to the dynamo shaft 12, and drives gears 43 and 49 described above. FIGS. 7, 8 and 9 also have the gear 69, arranged in the same way.

FIG. 7 shows a sixth embodiment, wherein a dry-sump controller disengages the auxiliary hydraulic pumps. FIG. 8 shows a seventh embodiment, like that of FIG. 6 except that separate fluid connection lines 61A, 62A are used instead of common manifolds 61. FIG. 9 portrays an eighth embodiment, similar that of FIG. 7 except that separate fluid connection lines are used instead of common manifolds.

Both pumps could have fixed displacement, or there could be one or more fixed-displacement and some variable-displacement pumps, in various configurations, with some sacrifice in efficiency.

The brake 59 is optional.

The scope of the invention is defined by the claims.

What is claimed is:

1. An uninterrupted power supply system (UPS) for providing electrical power when a primary electrical power source is not functioning normally, said UPS having an electric dynamo and a flywheel, and comprising:

a differential having a first shaft connected with said flywheel and a second shaft connected with said dynamo, for transmitting power between said flywheel and said dynamo, and having provision for drivable connection with a differential gear element of said differential;

first transmission means having a variable ratio of input and output speeds, connected with one of (a) said flywheel and (b) said dynamo, and drivably connected with said differential gear element, for controlling the ratio of the speed of said dynamo to the speed of said flywheel;

auxiliary transmission means having a variable ratio of input and output speeds, drivably connected with said differential gear element and with one of (a) said flywheel and (b) said dynamo, for transmitting power drawn from said flywheel, said auxiliary transmission means comprising at least one auxiliary transmission;

interdiction means for interrupting power flow through said auxiliary transmission means to said differential gear element in response to a control signal;

sensing means for sensing conditions of the power system and for, in response to said conditions, providing said control signal to said interdiction means to interrupt said power when said primary power source is functioning normally, and to transmit said power when said primary power source is not functioning normally;

ratio-control means for controlling said variable speed ratios to control the speed of said flywheel during normal operation of said primary source and to control the speed of said dynamo when said primary source is not functioning normally.

2. A UPS as in claim 1 and wherein at least one of said first transmission means and said auxiliary transmission means comprises fluid power transmission means.

3. A UPS as in claim 2 and wherein said fluid power transmission means comprises at least one fluid pump that communicates with at least one fluid motor to drive said fluid motor, at least one of said pump and said motor having variable displacement.

4. A UPS as in claim 3 and wherein said interdiction means for interrupting power flow through said auxiliary transmission means comprises clutch means for disconnecting said auxiliary fluid pump of said auxiliary transmission means.

5. A UPS as in claim 3 and wherein said said auxiliary transmission means comprising at least one auxiliary transmission comprises, when said auxiliary transmission means comprises more than one auxiliary transmission, a common reservoir for at least two of said auxiliary fluid pumps.

6. A UPS as in claim 1 and wherein said differential is a planetary differential.

7. A UPS as in claim 2 and wherein said interdiction means comprises dry-sump apparatus operable with said fluid power transmission means to engage and disengage said fluid power transmission means by moving fluid in and out of said transmission means.

8. A UPS as in claim 1 and wherein said interdiction means comprises clutch means.

9. A UPS as in claim 1 and wherein said first transmission means is drivably connected with said flywheel and with said differential gear element.

10. A UPS as in claim 1 and wherein said auxiliary transmission means is drivably connected with said flywheel and with said differential gear element.

11. A method for exchanging power between an electric dynamo and a flywheel when a main electrical power source is operating normally, and for providing power from the rotating flywheel to the dynamo when said main source is not functioning normally, said method comprising:

sensing whether or not said main source is in a normal power condition;

(a) during a normal condition of said main source, exchanging power between said flywheel and said dynamo, using a differential drivably disposed between said dynamo and said flywheel, said differential having a first principal shaft coupled with said dynamo, a second principal shaft coupled with said flywheel, and provision for drivable connection to a differential gear element of said differential;

drivably connecting said differential gear element with one end of at least one primary variable transmission whose other end is drivably connected with one of (i) said dynamo and (ii) said flywheel;

sensing and controlling the speed of said flywheel during said normal condition by controlling the speed ratio of said primary transmission;

(b) upon start of an abnormal condition of said main source, connecting at least one auxiliary variable transmission to assist said primary transmission in driving said carrier even at low flywheel speeds, said auxiliary transmissions being connected in schematic parallel when more than one auxiliary transmission is used;

sensing and controlling the speed of said dynamo by controlling the speed ratios of said primary and auxiliary transmissions to control the speed of said dynamo while said primary source is not functioning normally.

12. A method as in claim 11 and wherein said step of drivably connecting said differential gear element with one end of a primary variable transmission whose other end is drivably connected with one of (i) said dynamo and (ii) said flywheel comprises a step of hydraulically drivably connecting said differential gear element with one end of a fluid power transmission.

13. A method as in claim 11 and wherein said step, upon start of an abnormal condition of said main source, of connecting at least one auxiliary variable transmission to assist said primary transmission in driving said carrier comprises a step of connecting at least one fluid power transmission through a hydraulic link.

14. A method as in claim 11 and wherein said step of connecting at least one auxiliary variable transmission to assist said primary transmission comprises a step of actuating at least one clutch.

15. A method as in claim 11 and wherein said step of connecting at least one auxiliary variable transmission comprises a step of engaging dry-sump apparatus by transferring fluid in said dry-sump apparatus.

16. A method as in claim 11 and wherein said step of driving said flywheel with power from said dynamo comprises a step of hydraulically driving said flywheel with a transmission having a fluid pump that communicates with a fluid motor to drive said fluid motor.

17. A method as in claim 11 and wherein said step of connecting at least one auxiliary variable transmission to assist said primary transmission in driving said carrier comprises a step of connecting at least one hydraulic transmission having a fluid pump that communicates with a fluid motor to drive said fluid motor.

18. A method as in claim 11 and wherein said first transmission means is drivably connected with said flywheel and with said differential gear element of said differential.

19. A method as in claim 11 and wherein said auxiliary transmission means is drivably connected with said flywheel and with said differential gear element of said differential.

* * * * *